(12) United States Patent
Fukushi et al.

(10) Patent No.: US 9,702,019 B2
(45) Date of Patent: Jul. 11, 2017

(54) QUENCHED STEEL PIPE MEMBER, VEHICLE AXLE BEAM USING QUENCHED STEEL PIPE MEMBER, AND METHOD FOR MANUFACTURING QUENCHED STEEL PIPE MEMBER

(71) Applicant: Nippon Steel & Sumitomo Metal Corporation, Tokyo (JP)

(72) Inventors: Takaaki Fukushi, Tokyo (JP); Koichi Sato, Tokyo (JP); Satoshi Kato, Tokyo (JP); Hideki Hamatani, Tokyo (JP); Yoshiaki Hirota, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 393 days.

(21) Appl. No.: 14/409,061

(22) PCT Filed: Sep. 12, 2013

(86) PCT No.: PCT/JP2013/074687
§ 371 (c)(1),
(2) Date: Dec. 18, 2014

(87) PCT Pub. No.: WO2014/046007
PCT Pub. Date: Mar. 27, 2014

(65) Prior Publication Data
US 2015/0144228 A1    May 28, 2015

(30) Foreign Application Priority Data

Sep. 20, 2012  (JP) .................................. 2012-207249

(51) Int. Cl.
*C23C 2/06*    (2006.01)
*C23C 2/28*    (2006.01)
(Continued)

(52) U.S. Cl.
CPC ............... *C21D 9/08* (2013.01); *B32B 15/013* (2013.01); *B60B 35/02* (2013.01); *C21D 1/34* (2013.01);
(Continued)

(58) Field of Classification Search
CPC ......... B32B 15/013; B60B 35/02; C21D 1/34; C21D 1/60; C22C 38/00; C22C 38/02;
(Continued)

(56) References Cited

U.S. PATENT DOCUMENTS

2001/0042393 A1* 11/2001 Kefferstein ............ B21D 22/20
72/47
2002/0005622 A1    1/2002 Glaser et al.
(Continued)

FOREIGN PATENT DOCUMENTS

CN    101713045    5/2010
CN    102174684    9/2011
(Continued)

OTHER PUBLICATIONS

International Search Report dated Dec. 3, 2013 issued in corresponding PCT Application No. PCT/JP2013/074687 [with English Translation].
(Continued)

*Primary Examiner* — Colleen Dunn
(74) *Attorney, Agent, or Firm* — Birch, Stewart, Kolasch & Birch, LLP (57) ABSTRACT

A quenched steel pipe member is formed of a GI galvanized steel pipe, in a middle section in a longitudinal direction of the GI galvanized steel pipe, a cross-section perpendicular to the longitudinal direction has a substantially V shape including a contact section at which opposite parts of an inner circumferential surface of the GI galvanized steel pipe come into contact with each other, the contact section is bonded
(Continued)

using a Fe—Zn alloy phase, and a micro Vickers hardness at a location 50 μm deep from a base material surface layer is 95% or more of a micro Vickers hardness at a location 200 μm deep from the base material surface layer.

11 Claims, 3 Drawing Sheets

(51) Int. Cl.
  *C21D 9/08*   (2006.01)
  *C22C 38/14*   (2006.01)
  *B32B 15/01*   (2006.01)
  *C22C 38/02*   (2006.01)
  *C22C 38/04*   (2006.01)
  *C23C 2/38*   (2006.01)
  *B60B 35/02*   (2006.01)
  *C21D 1/34*   (2006.01)
  *C21D 1/60*   (2006.01)
  *C22C 38/00*   (2006.01)
  *C21D 9/00*   (2006.01)
  *C21D 1/18*   (2006.01)

(52) U.S. Cl.
  CPC ............... *C21D 1/60* (2013.01); *C22C 38/00* (2013.01); *C22C 38/02* (2013.01); *C22C 38/04* (2013.01); *C22C 38/14* (2013.01); *C23C 2/06* (2013.01); *C23C 2/28* (2013.01); *C23C 2/38* (2013.01); *B60B 2360/102* (2013.01); *C21D 1/18* (2013.01); *C21D 9/0068* (2013.01)

(58) Field of Classification Search
  CPC   C22C 38/04; C22C 38/14; C23C 2/06; C23C 2/28; C23C 2/38
  See application file for complete search history.

(56) References Cited

U.S. PATENT DOCUMENTS

| | | | | |
|---|---|---|---|---|
| 2002/0117890 A1* | 8/2002 | Glaser | ................... | B60G 7/001 |
| | | | | 301/127 |
| 2004/0166360 A1* | 8/2004 | Imai | .......................... | C23C 2/26 |
| | | | | 428/658 |
| 2005/0252262 A1* | 11/2005 | Imai | .......................... | C23C 2/26 |
| | | | | 72/47 |
| 2006/0121305 A1* | 6/2006 | Yoshikawa | ............... | C23C 2/26 |
| | | | | 428/629 |
| 2011/0121639 A1* | 5/2011 | Fukushi | ................. | B21D 53/88 |
| | | | | 301/124.1 |
| 2012/0282487 A1* | 11/2012 | Ogawa | ................. | C21D 8/0426 |
| | | | | 428/659 |

FOREIGN PATENT DOCUMENTS

| | | |
|---|---|---|
| EP | 1439240 | 7/2004 |
| EP | 1630244 | 3/2006 |
| EP | 2298465 | 3/2011 |
| EP | 2500445 | 9/2012 |
| JP | 2001-146110 | 5/2001 |
| JP | 2003-206698 | 7/2003 |
| JP | 2004-314651 | 11/2004 |
| JP | 2005-074464 A | 3/2005 |
| JP | 2005-171337 | 6/2005 |
| JP | 2006-045592 | 2/2006 |
| JP | 2007-245176 | 9/2007 |
| JP | 2009-274077 | 11/2009 |
| JP | 2011-527262 A | 10/2011 |
| WO | 2010/004370 A1 | 1/2010 |

OTHER PUBLICATIONS

Ueno, Masakatsu et al., "New Empirical Formula for Estimation of Hardenability from Chemical Compositions," 74 (1988), Iron and Steel Institute of Japan, p. 1073-1080 [with English Abstract].

Office Action dated Feb. 14, 2016 issued in related Chinese Application No. 201380038667.4 [with Partial Translation of Search Report].

Search Report dated Feb. 25, 2016 issued in corresponding European Application No. 13839383.0.

Office Action dated Dec. 16, 2015 issued in corresponding Korean Application No. 10-2015-7002219.

* cited by examiner

QUENCHED STEEL PIPE MEMBER, VEHICLE AXLE BEAM USING QUENCHED STEEL PIPE MEMBER, AND METHOD FOR MANUFACTURING QUENCHED STEEL PIPE MEMBER

TECHNICAL FIELD OF THE INVENTION

This application is a national stage application of International Application No. PCT/JP2013/074687, filed Sep. 12, 2013, which claims priority to Japanese Patent Application No. 2012-207249, filed on Sep. 20, 2012, each of which is incorporated by reference in its entirety.

The present invention relates to a quenched steel pipe member, a vehicle axle beam using a quenched steel pipe member, and a method for manufacturing a quenched steel pipe member.

RELATED ART

A vehicle axle beam is a member that couples the right axle and the left axle. Since a load is repeatedly applied to the vehicle axle beam during the travelling of the vehicle, improved fatigue properties are required.

Therefore, there has been proposed a method for manufacturing a vehicle axle beam in which a steel pipe is press-formed and then quenched so as to increase the strength and ensure fatigue properties as described in Patent Document 1.

However, in this method, there have been problems in that the quenching in a furnace involves long heating time, the surface of the outermost layer of the member is decarburized and thus softened, and sufficient fatigue properties cannot be obtained.

In addition, to suppress the softening of the surface layer, there has been proposed a technique in which a steel pipe is heated after galvanization is carried out on the surface of the steel pipe, whereby a carbon-enriched layer is formed on the steel surface, and the quenched surface layer is hardened as described in Patent Document 2.

However, in this method as well, the heating in a furnace requires long heating, and zinc is volatilized during the heating. Therefore, there have been problems in that it is necessary to sparely prepare zinc in consideration of the amount volatilized, and considerable costs are required.

Patent Document 3 discloses an axle beam having excellent fatigue properties which is obtained by press-forming a steel pipe under predetermined pressing conditions so as to obtain a V-like cross-section.

However, Patent Document 3 is intended to provide an axle beam capable of exhibiting excellent fatigue properties even when a heat treatment such as quenching is not carried out, and does not describe anything about the decarburization of the outermost surface through the above-described heat treatment.

PRIOR ART DOCUMENT

Patent Document

[Patent Document 1] Japanese Unexamined Patent Application, First Publication No. 2005-171337
[Patent Document 2] Japanese Unexamined Patent Application, First Publication No. 2006-45592
[Patent Document 3] Japanese Unexamined Patent Application, First Publication No. 2009-274077

DISCLOSURE OF THE INVENTION

Problems to be Solved by the Invention

An object of the present invention is to solve the above-described problem of the related art and provide a low-cost quenched steel pipe member having excellent fatigue properties, a vehicle axle beam, and a method for manufacturing a quenched steel pipe member.

Means for Solving the Problem

The overview of the present invention is as described below.

(1) According to a first aspect of the present invention, there is provided a quenched steel pipe member in which the quenched steel pipe member is formed of a GI galvanized steel pipe, in a middle section in a longitudinal direction of the GI galvanized steel pipe, a cross-section perpendicular to the longitudinal direction has a substantially V shape including a contact section at which opposite parts of an inner circumferential surface of the GI galvanized steel pipe come into contact with each other, the contact section is bonded using a Fe—Zn alloy phase, and a micro Vickers hardness at a location 50 μm deep from a base material surface layer is 95% or more of a micro Vickers hardness at a location 200 μm deep from the base material surface layer.

(2) The quenched steel pipe member according to the above-described (1), in which the micro Vickers hardness at the location 50 μm deep from the base material surface layer of the GI galvanized steel pipe may be 500 Hv or more.

(3) The quenched steel pipe member according to the above-described (1) or (2), in which the contact section may be formed throughout a length that is 50% or more of a total length of the GI galvanized steel pipe.

(4) According to a second aspect of the present invention, there is provided a vehicle axle beam in which the quenched steel pipe member according to any one of the above-described (1) to (3) is used.

(5) According to a third aspect of the present invention, there is provided a method for manufacturing a quenched steel pipe member including press-forming a GI galvanized steel pipe so that, in a middle section in a longitudinal direction of the GI galvanized steel pipe, a cross-section perpendicular to the longitudinal direction has a substantially V shape including a contact section at which opposite parts of an inner circumferential surface of the GI galvanized steel pipe come into contact with each other; heating and holding the press-formed GI galvanized steel pipe under conditions in which a plated zinc amount A (g/m$^2$), a maximum heating temperature T (° C.) that is 850° C. or higher, and a holding time t (hr) at the maximum heating temperature satisfy the following formula (1); and cooling the heated and held GI galvanized steel pipe through water cooling, thereby bonding the contact section using a Fe—Zn alloy phase.

$$(T+273.15)\times(\log\ t+20)/A \leq 340 \quad \text{Formula (1)}.$$

(6) The method for manufacturing a quenched steel pipe member according to the above-described (5), in which, in the cooling, the heated and held GI galvanized steel pipe may be water-cooled to 200° C. or lower at a cooling rate of 30° C./s or more.

(7) The method for manufacturing a quenched steel pipe member according to the above-described (5) or (6), in which the plated zinc amount A may be 60 g/m$^2$ or more.

(8) The method for manufacturing a quenched steel pipe member according to any one of the above-described (5) to (7), in which, in the press-forming, the GI galvanized steel pipe may be press-formed so that the contact section is formed throughout a length that is 50% or more of a total length of the GI galvanized steel pipe.

(9) The method for manufacturing a quenched steel pipe member according to any one of the above-described (5) to (8), in which, in the heating and holding, the (GI galvanized steel pipe may be electrically heated.

(10) The method for manufacturing a quenched steel pipe member according to any one of the above-described (5) to (9), in which, in the heating and holding, the press-formed GI galvanized steel pipe may be electrically heated so as to be held in a temperature range of an Ac3 point of steel or higher for 3 seconds to 30 seconds.

(11) The method for manufacturing a quenched steel pipe member according to any one of the above-described (5) to (10), in which the GI galvanized steel pipe may have chemical composition having an Ac3 point of 850° C. or lower.

Effects of the Invention

According to the above-described quenched steel pipe member, since the quenched steel pipe member is formed of the GI galvanized steel pipe, the decarburization of the surface layer is suppressed due to the galvanization, and therefore a high surface layer hardness can be ensured, and the fatigue properties improve.

In addition, since the contact section at which opposite parts of the inner circumferential surface of the GI galvanized steel pipe come into contact with each other is bonded using the Fe—Zn alloy phase, it is possible to suppress a decrease in the fatigue life caused by the friction of the contact section, and the fatigue properties improve. Therefore, thickness reduction and weight reduction become possible, and it is possible to significantly decrease the costs.

In addition, according to the above-described method for manufacturing a quenched steel pipe member, when the GI galvanized steel pipe is heated and held under conditions satisfying Formula (I), it is possible to suppress the decarburization of the surface layer with a minimum plated zinc amount, or to suppress the decarburization of the surface layer by adjusting the plated zinc amount in accordance with a heating and holding facility. Therefore, it is possible to significantly decrease the costs.

EMBODIMENTS OF THE INVENTION

Hereinafter, a vehicle axle beam according to a first embodiment of the present invention (hereinafter, referred to as the axle beam) will be described in detail. In the following description, the axle beam will be described as a specific example of a quenched steel pipe member, but a quenched steel pipe member according to the present invention is not limited thereto, and examples thereof include a variety of quenched steel pipe members requiring improved fatigue properties such as structural members for industrial machinery and structural members for construction.

Figure 1A:
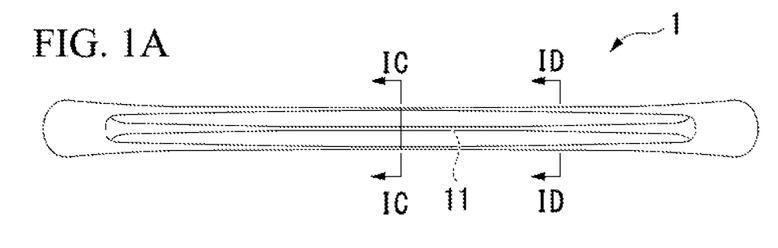
FIG. 1A is a plan view of a vehicle axle beam according to a present embodiment.
Figure 1B:
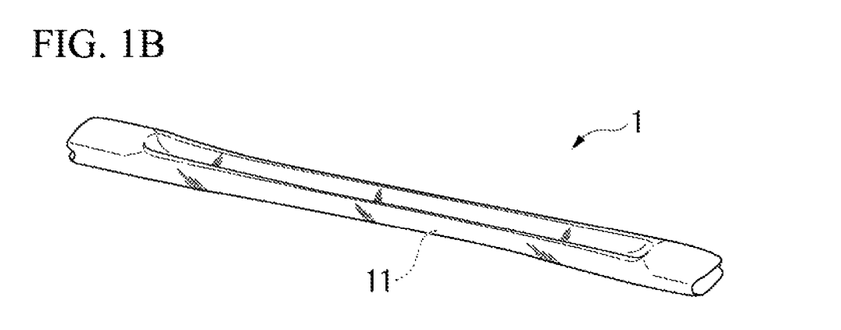
FIG. 1B is a perspective view of the vehicle axle beam.
Figure 1C:
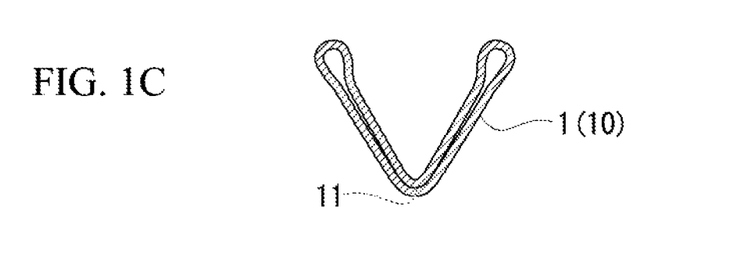
FIG. 1C is a cross-sectional view in the direction of IC-IC in FIG. 1A.
Figure 1D:
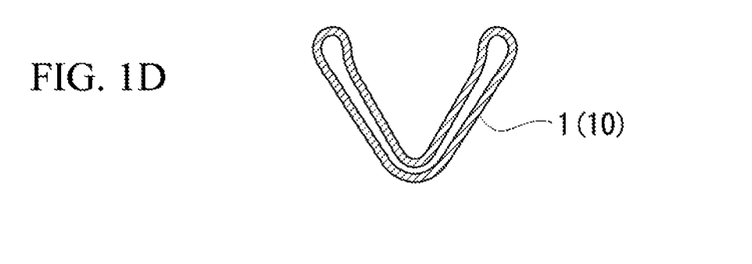
FIG. 1D is a cross-sectional view in the direction of ID-ID in FIG. 1A.

FIGS. 1A and 1B are a plan view and a perspective view illustrating an axle beam 1 according to the present embodiment. FIG. 1C is a cross-sectional view in the direction of IC-IC in FIG. 1A, and FIG. 1D is a cross-sectional view in the direction of ID-ID in FIG. 1A.

As illustrated in FIGS. 1A and 1B, the axle beam 1 according to the present embodiment is formed by press-forming a GI galvanized steel pipe 10 so that a cross-section perpendicular to a longitudinal direction of the axle beam (hereinafter, referred to as the perpendicular cross-section) has a substantially V shape.

In addition, as illustrated in FIG. 1C, the axle beam 1 according to the present embodiment has a contact section 11 at which opposite parts of an inner circumferential surface come into contact with each other in a central part of the axle beam in the longitudinal direction.

The contact section 11 is bonded using a Fe—Zn alloy phase by carrying out a quenching treatment in a state in which opposite parts of a zinc plate on the inner circumferential surface of the GI galvanized steel pipe 10 are in contact with each other.

In addition to an effect that improves the stiffness of the axle beam 1, the above-described configuration is capable of suppressing a decrease in the fatigue life caused by the friction between the opposite parts of the inner circumferential surface of the GI galvanized steel pipe 10, and improving the fatigue properties.

In addition, as illustrated in FIG. 1D, the opposite parts of the inner circumferential surface may not be in contact with each other in portions away from the central part in the longitudinal direction. That is, the opposite parts of the contact section 11 need to be in contact with each other only in the central part of the GI galvanized steel pipe 10 in the longitudinal direction.

However, to more preferably exhibit the effect that improves the fatigue properties, the contact section 11 is preferably formed throughout a length that is 50% or more of the total length of the GI galvanized steel pipe 10, and more preferably formed throughout a length that is 70% or more of the total length.

In addition, the axle beam 1 according to the present embodiment is obtained by carrying out a quenching treatment after the press-forming of the GI galvanized steel pipe 10, and therefore it is possible to carry out the quenching treatment while suppressing decarburization from the surface layer using the effect of the galvanization, and consequently, increase the hardness of the entire axle beam 1. That is, when decarburization is suppressed in the surface part of the axle beam 1, it is possible to ensure the same hardness as that at the central part in the thickness direction, and consequently, improve the fatigue properties.

More specifically, in the axle beam 1 according to the present embodiment, when the micro Vickers hardness at a location 200 µm deep from the base material surface layer is represented by X, and the micro Vickers hardness at a location 50 µm deep from the base material surface layer is represented by Y, the value of $(Y/X) \times 100$ is set to 95 or more. Meanwhile, the micro Vickers hardness is measured at a load of 50 g.

When the value of (Y/X)×100 is less than 95, there is a concern over a decrease in the fatigue life due to fatigue cracks from the surface layer. The value of (Y/X)×100 is preferably 96 or more, and more preferably 97 or more.

In addition, the micro Vickers hardness Y at a location 50 µm deep from the base material surface layer is preferably set to 500 Hv or more, and more preferably set to 540 Hv or more in terms of the micro Vickers hardness since improved fatigue properties are ensured.

As described above, according to the axle beam 1 of the present embodiment, since the axle beam is formed of the GI galvanized steel pipe 10, the decarburization of the surface layer is suppressed due to the effect of the galvanization, and an effect that increases the hardness of the surface layer and thus improves the fatigue properties is obtained. Since the contact section 11 at which opposite parts of the inner circumferential surface of the GI galvanized steel pipe 10 come into contact with each other is bonded using the Fe—Zn alloy phase, it is possible to suppress a decrease in the fatigue life caused by the friction between opposite parts of the inner circumferential surface, and to synergistically improve the fatigue properties. Therefore, thickness reduction and weight reduction become possible, and it is possible to significantly decrease the costs.

In the present invention, there is no particular limitation regarding the chemical components of steel for the GI galvanized steel pipe 10, but a preferred component composition will be described. Hereinafter, regarding the amounts of the chemical components, '%' indicates 'mass %'.

The steel for the GI galvanized steel pipe 10 may include, as the chemical components, C, Si, Mn, Ti, and B in the following ranges.

C: 0.15% to 0.30%

C is an element that determines the strength of the axle beam 1. To ensure a strength for having sufficient fatigue properties, the amount of C is preferably set to 0.15% or more, and more preferably set to 0.20% or more. To set the hardness Hv to 500 or more, the amount of C is preferably set to 0.24% or more. In addition, to suppress the occurrence of quenching cracks, the amount of C is preferably set to 0.30% or less, and more preferably set to 0.25% or less.

Si: 0.05% to 0.35%

Si is a deoxidizing element, and also contributes to solid solution strengthening. To obtain the above-described effects, 0.05% or more of Si is preferably included. In addition, when the amount of Si is set to 0.35% or less, it is possible to ensure toughness. The lower limit of the amount of Si is more preferably 0.20%, and the upper limit of the amount of Si is more preferably 0.30%.

Mn: 0.5% to 2.0%

Mn is an element that improves hardenability, and the amount of Mn is preferably set to 0.5% or more since an effect that improves hardenability can be sufficiently ensured. In addition, the amount of Mn is preferably set to 2.0% or less since the deterioration of the delayed fracture properties can be suppressed, the precipitation of MnS can be suppressed, and a decrease in the fatigue strength in the vicinity of an electric resistance welded section can be avoided.

The lower limit of the amount of Mn is more preferably 1.0%, and the upper limit of the amount of Mn is more preferably less than 1.7%.

Ti: 0.005% to 0.05%

Ti acts to stably and effectively improve hardenability obtained by the addition of B by fixing N in steel in a TiN form so as to suppress the precipitation of BN. Therefore, based on the stoichiometry of TiN, Ti is preferably added in an amount that is 3.42 times or more the amount of N, and the preferred range of the amount of Ti is also automatically determined from the range of the amount of N.

However, since some of the Ti is precipitated in a carbide form, the amount of Ti is preferably set in a range of 0.005% to 0.05% which is higher than the theoretical value to more reliably fix N. The amount of Ti is more preferably in a range of 0.01% to 0.02%.

B: 0.0005% to 0.005%

B is an element that significantly improves the hardenability of the steel by the addition of a small amount. The amount of B is preferably set to 0.0005% or more, and more preferably set to 0.001% or more since an effect that improves hardenability is preferably obtained.

In addition, the amount of B is preferably set to 0.005% or less, and more preferably set to 0.002% or less since the generation of a coarse B-containing precipitate can be suppressed, and embrittlement can be suppressed.

In addition, the steel for the GI galvanized steel pipe 10 may contain, as chemical components, Al, P, S, N, and O in the following limited ranges.

Al: 0.08% or Less

Al is an effective element as a deoxidizing material of molten steel, and 0.01% or more of Al is preferably added. In addition, since Al is also an element that fixes N, the amount of Al has a significant influence on the grain size or mechanical properties. The amount of Al is preferably set to 0.08% or less since it is possible to suppress the generation of surface defects in a product caused by non-metallic inclusions. The amount of Al is more preferably 0.05% or less.

P: 0.05% or Less

P is an element having an adverse influence on welding cracking resistance and toughness, and thus the amount of P is preferably set to 0.05% or less, and more preferably set to 0.03% or less.

S: Less than 0.0030%

S deteriorates toughness, and causes the precipitation of MnS which leads to a decrease in the fatigue strength in the vicinity of an electric resistance welded section, and therefore the amount of S is preferably set to less than 0.0030%, and more preferably set to 0.0026% or less.

In addition, to suppress the precipitation of MnS, it is preferable to suppress the amount of S in consideration of the amount of Mn rather than to suppress only the amount of S, and specifically the value of the product of the amount of Mn and the amount of S is preferably set to 0.0025 or less. When the value of the product of the amount of Mn and the amount of S is set to 0.0025 or less, it is possible to sufficiently ensure the fatigue strength in the vicinity of an electric resistance welded section.

N: 0.006% or Less

N is an element having an effect that increases strength by precipitating a nitride or a carbonitride. However, in B-added steel, there are problems of the degradation of hardenability due to the precipitation of BN, the degradation of hot workability or fatigue strength due to the precipitation of TiN which is caused by Ti being added to prevent the precipitation of BN as described above, and the degradation of toughness. Meanwhile, TiN also has an effect that suppresses the coarsening of a γ grain diameter at a high temperature and improves toughness. Therefore, to obtain the optimal balance among hot workability, fatigue strength, and toughness, the amount of N is preferably set to 0.006% or less. Meanwhile, the amount of N is more preferably in a range of 0.001% to 0.005%, and still more preferably in a range of 0.002% to 0.004%.

O: 0.004% or Less

O is an element that forms CaO and thus impairs the effect of the addition of Ca, and therefore the amount of O is preferably limited to 0.004% or less.

In addition, the steel for the GI galvanized steel pipe 10 may contain, as chemical components and selective elements, one or more of Mo, Cr, Nb, V, and Ni as necessary in the following ranges.

Mo: 0.05% to 0.5%

Mo is an element having an effect that improves hardenability. When the amount of Mo is less than 0.05%, the above-described effect cannot be sufficiently expected, and on the other hand, when the amount of Mo exceeds 0.5%, the alloy cost increases, and therefore the amount of Mo is preferably set in a range of 0.05% to 0.5%.

Cr: 0.05% to 1.0%

Cr is not an essential additive element, but is an element added for the purpose of improving hardenability. To sufficiently obtain the hardenability-improving effect, the amount of Cr is preferably set to 0.05% or more, and more preferably set to 0.10% or more. In addition, the amount of Cr is preferably set to 1.0% or less, and more preferably set to 0.8% or less since the generation of defects during electric resistance welding is suppressed.

Nb: 0.01% to 0.1%

Nb has an effect that decreases the grain size of the steel and improves toughness in addition to an effect of precipitation strengthening from a Nb carbonitride. When the amount of Nb is 0.01% or more, an effect that improves strength and toughness is sufficiently obtained. On the other hand, even when the amount of Nb exceeds 0.1%, it is not possible to expect an additional effect that further improves strength and toughness, and only the cost is increased, and therefore the amount of Nb is preferably set in a range of 0.01% to 0.1%.

V: 0.01% to 0.1%

V is an element having an effect of precipitation strengthening from a V carbonitride. The amount of V is preferably set to 0.01% or more since the above-described effect can be preferably exhibited. On the other hand, even when the amount of V exceeds 0.1%, it is not possible to expect a better effect of precipitation strengthening, and only the alloy cost is increased, and therefore the amount of V is preferably set to 0.1% or less.

Ni: 0.1% to 1.0%

Ni is an element having an effect that improves hardenability and toughness. The amount of Ni is preferably set to 0.1% or more since the above-described effect can be preferably exhibited. On the other hand, even when the amount of Ni exceeds 1.0%, the alloy cost is increased, and therefore the amount of Ni is preferably set to 1.0% or less.

That is, the steel for the GI galvanized steel pipe 10 contains, as chemical components, C, Si, Mn, Ti, and B in the above-described ranges. Al, P, S, N, and O in the above-described limited ranges, and contains, as selective elements, one or more of Mo. Cr, Nb, V, and Ni as necessary in the above-described ranges, and the balance is consisting of Fe and unavoidable impurities.

In addition, in the present invention, to obtain a martensite structure of the axle beam 1 through quenching, it is necessary to sufficiently ensure the hardenability of a material. As an index of hardenability, for example, the critical cooling rate Vc90 (° C./s) which has been thus far known by "Iron and steel, 74 (1988) P.1073" is preferably used. This is an index represented by the following (Formula A), and refers to a cooling rate at which the volume ratio of martensite reaches 90% or more. Therefore, the hardenability improves as Vc90 decreases, and a martensite structure can be obtained even when the cooling rate becomes slow.

$$\log Vc90 = 2.94 - 0.75\beta \qquad \text{(Formula A)}$$

Here, $\beta = 2.7C + 0.4Si + Mn + 0.8Cr + 2.0Mo + 0.45Ni$.

In a case in which boron (B) is not included, (Formula A) is changed to (Formula A').

$$\log Vc90 = 2.94 - 0.75(\beta' - 1) \qquad \text{(Formula A')}$$

Here, $\beta' = 2.7C + 0.4Si + Mn + 0.8Cr + Mo + 0.45Ni$.

Next, a method for manufacturing the axle beam 1 will be described in detail.

Figure 2:
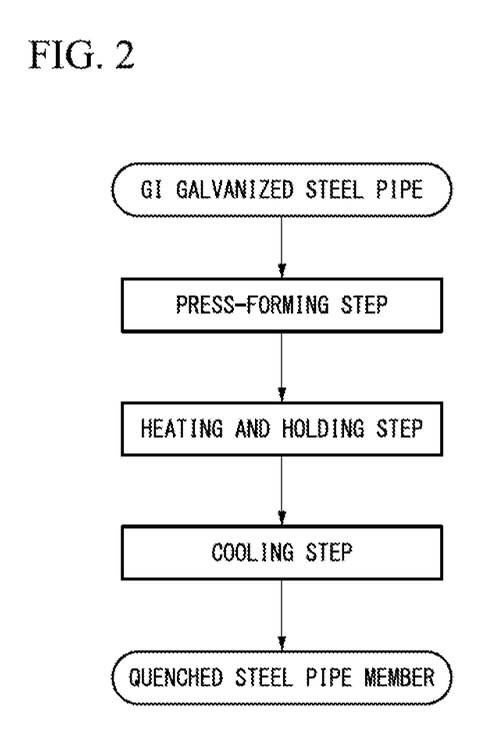
FIG. 2 is a step explanatory view for manufacturing a quenched steel pipe member according to the present embodiment.

As illustrated in the flow diagram of FIG. 2, the method for manufacturing the axle beam 1 according to the present embodiment includes at least a press-forming step, a heating and holding step, and a cooling step. Hereinafter, the respective steps will be described in detail.

(Press-Forming Step)

In the press-forming step, first, the GI galvanized steel pipe 10 is press-formed into a substantially V shape by supplying an inward displacement in the longitudinal direction, thereby producing a shape of the axle beam 1. That is, the GI galvanized steel pipe 10 is press-formed so that a cross-section perpendicular to the longitudinal direction in the middle section in the longitudinal direction has a substantially V shape including the contact section 11 at which opposite parts of an inner circumferential surface of the GI galvanized steel pipe 10 come into contact with each other.

The specific shape is as illustrated in FIGS. 1A to 1D, and the contact section 11 at which opposite parts of the inner circumferential surface of the steel pipe come into contact with each other is formed in the middle section in the longitudinal direction as illustrated in FIG. 1C. Both end sections have a shape in which the steel pipe is flatly crushed.

(Heating and Holding Step)

In the heating and holding step, the GI galvanized steel pipe 10 press-formed as described above is heated and held under conditions satisfying the following formula (1).

$$(T+273.15) \times (\log t + 20)/A \leq 340 \qquad \text{Formula (1)}$$

In Formula (I), A represents the plated zinc amount (g/m$^2$) of the GI galvanized steel pipe 10, T represents the maximum heating temperature (° C.) that is 850° C. or higher, and t represents the holding time t (hr) at the maximum heating temperature. In the present specification, $(T+273.15) \times (\log t+20)$ regarding the heating conditions will be called a heat treatment parameter B.

When the plated zinc amount A and the heat treatment parameter B are designed so as to satisfy Formula (1), it is possible to achieve the value of (Y/X)×100 to be 95 or more in which X represents the micro Vickers hardness at a location 200 μm deep from the base material surface layer, and Y represents the micro Vickers hardness at a location 50 μm deep from the base material surface layer.

Since the maximum heating temperature is set to 850° C. or higher, it becomes possible to obtain a martensite as quenched structure. On the other hand, when the maximum heating temperature is lower than 850° C. the temperature is in a two-phase region, and the steel pipe is not fully quenched, which leads to the abrupt degradation of the fatigue properties.

That is, when the GI galvanized steel pipe 10 is heated and held under conditions satisfying Formula (1), it becomes possible to synergistically improve the fatigue properties from an effect that improves the fatigue properties by the suppression of surface layer decarburization and an effect that improves the fatigue properties by the alloying of the contact section 11.

The plated zinc amount A of the GI galvanized steel pipe 10 is preferably set to 60 g/m² or more since surface layer decarburization can be more reliably suppressed in the heating and holding step.

Examples of the heating method in the heating and holding step include electrical heating, induction heating, and furnace heating. When productivity is taken into account, electrical heating is more preferred.

The upper limit of the maximum heating temperature is not particularly specified; however, when the upper limit is an extremely high temperature, there is a concern over the volatilization of zinc from the surface of the steel pipe. Therefore, the upper limit is set to 1100° C. to more reliably suppress surface layer decarburization.

The holding time is preferably set to 3 seconds or longer in a temperature range of an Ac3 point or higher. When the holding time is 3 seconds or longer, temperature variation is more reliably suppressed, and therefore it is possible to decrease hardness variation after quenching. In addition, since it is possible to reliably diffuse iron into a galvanized layer, the contact section 11 can be stably bonded using an Fe—Zn alloy phase.

In addition, the holding time is preferably set to 30 seconds or shorter. This is because, when the holding time is set to 30 seconds or shorter, it is possible to suppress the excessive diffusion of iron into the galvanized layer.

Meanwhile, when the GI galvanized steel pipe 10 is heated through electrical heating, there is a concern that a current may drift and thus cause temperature variation; however, it could be confirmed that, when the holding time is set in a range of 3 seconds to 30 seconds, the steel pipe can be heated in a temperature range in which the steel pipe is uniformly quenched.

As described above, in the method for manufacturing the axle beam 1 according to the present embodiment, since the steel pipe is heated and held at the maximum heating temperature that is 850° C. or higher, the more decreased Ac3 point of the steel broadens the temperature range in which the steel pipe can be held, and facilitates the production, and therefore it is preferable to use a steel pipe having chemical composition having an Ac3 point of 850° C. or lower.

The Ac3 point can be computed from the following formula (2).

$$Ac3=910-203(C^{1/2})-15.2\times Ni+44.7\times Si+104\times V+31.5\times Mo+13\times W \quad \text{Formula (2)}$$

Meanwhile, chemical composition of the steel in which the hardenability (Vc90) reaches 70° C./second or lower can be expressed by the following formulae (3) and (4). Vc90 indicates the cooling rate at which martensite accounts for 90% or more of the structure.

$$10^{\alpha}\le 70 \quad \text{Formula (3)}$$

$$\alpha=2.94-0.75\times(2.7\times C+0.4\times Si+Mn+0.45\times Ni+0.8\times Cr+2\times Mo) \quad \text{Formula (4)}$$

Figure 3:
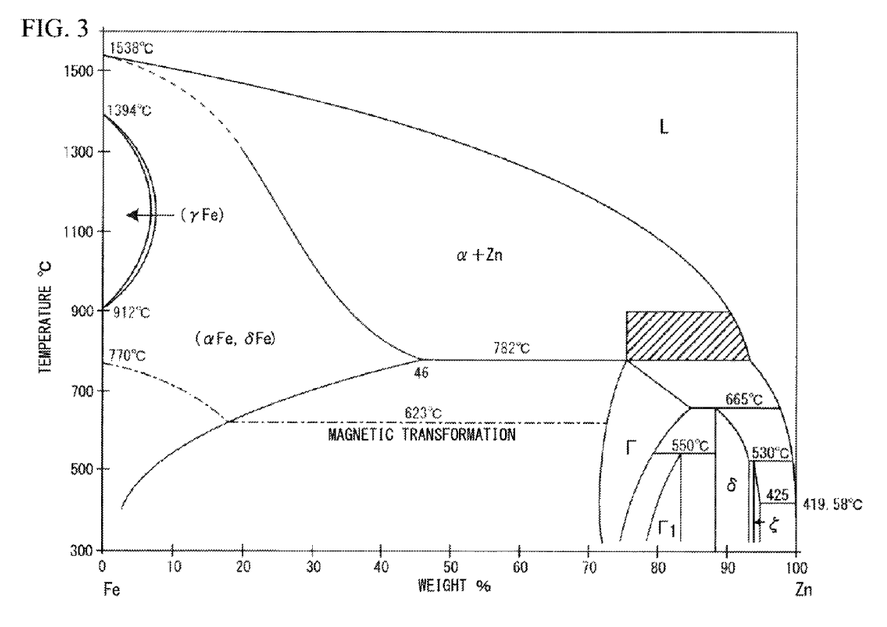
FIG. 3 is a phase diagram of a Fe—Zn alloy.

When the GI galvanized steel pipe 10 is held under the above-described conditions, the galvanized phase in the surface of the steel pipe belongs to the hatched area in the phase diagram of FIG. 3, and when the steel pipe is rapidly cooled from this area, the phase turns into a Fe—Zn alloy phase, and the contact section 11 in a portion having a V-like cross-sectional shape is bonded. As a result, it is possible to suppress a decrease in the fatigue life caused by the friction between the opposite parts of the inner circumferential surface of the GI galvanized steel pipe 10, and to improve the fatigue strength. As described above, when the diffusion of iron into a plated phase is insufficient, the phase is shifted to the left of the hatched area, and thus a multiphase of an iron-zinc alloy phase and iron is formed even after rapid cooling, which is not preferred.

(Cooling Step)

In the cooling step, the heated and held GI galvanized steel pipe 10 is water-cooled, and therefore the contact section 11 is bonded using the Fe—Zn alloy phase.

In the cooling step, it is preferable to cool the steel pipe to 200° C. or lower at a cooling rate of 30° C./s or more, since the fatigue properties can be further improved due to the structure turning into martensite. The cooling rate is more preferably set to 50° C./s or more.

Examples of the cooling method include spray cooling, immersion cooling, mist (air-water) cooling, and the like, and when productivity is taken into account, spray cooling is preferred.

In the axle beam 1 according to the present embodiment obtained in the above-described manner, the contact section 11 is bonded using the Fe—Zn alloy phase, and the micro Vickers hardness at a location 50 μm deep from the base material surface layer is 95% or more of the micro Vickers hardness at a location 200 μm deep from the base material surface layer, and therefore it becomes possible to synergistically improve the fatigue properties from an effect that improves the fatigue properties by the suppression of surface layer decarburization and an effect that improves the fatigue properties by the alloying of the contact section 11.

The reason for using GI (Galvanized Iron) instead of GA (Galvannealed) for galvanization is that GA is a material that has already been alloyed, and thus, even after short heating, GA is into the same state as GI that has been heated for a long time, a multiphase of an iron-zinc alloy phase and iron is formed even after cooling, and the effect that bonds the contact section 11 using the Fe—Zn alloy phase becomes insufficient.

EXAMPLE

Hereinafter, examples will be described.

As Invention Examples 1 to 6 and Comparative Examples 1 to 3, axle beams were manufactured by carrying out electric resistance welding GI steel sheets having components of 0.24% of C, 0.2% of Si, 1.2% of Mn, 0.02% of Ti, and 10 ppm of B, pressing, electrical heating, and spray cooling on, and the micro Vickers hardness at the location 50 μm deep from the base material surface layer, the micro Vickers hardness at the location 200 μm deep from the base material surface layer, and the fatigue properties were measured. In addition, for Invention Examples 1 to 6 and Comparative Examples 1 and 2, the contact sections were bonded through alloying.

Table 1 describes a variety of setting conditions and measurement results. A represents the plating amount (g/m²), T represents the maximum heating temperature (° C.), t represents the holding time (hr), B represents the heat treatment parameter, X represents the micro Vickers hardness at a location 200 μm deep from the base material surface layer, and Y represents the micro Vickers hardness at a location 50 μm deep from the base material surface layer.

TABLE 1

| | A (g/m²) | T (°C.) | t (hr) | B | B/A | Cooling rate (°C./s) | Cooling stop temperature (°C.) | X | Y | Y/X (%) | Fatigue properties |
|---|---|---|---|---|---|---|---|---|---|---|---|
| Invention Example 1 | 70 | 1000 | 0.017 | 23200 | 331 | 70 | 50 | 550 | 570 | 104 | Very Good |
| Invention Example 2 | 70 | 950 | 0.167 | 23511 | 336 | 70 | 50 | 560 | 555 | 99 | Very Good |
| Invention Example 3 | 70 | 850 | 0.167 | 21589 | 308 | 70 | 50 | 540 | 540 | 100 | Very Good |
| Invention Example 4 | 70 | 900 | 0.017 | 21378 | 305 | 70 | 100 | 555 | 550 | 99 | Very Good |
| Invention Example 5 | 70 | 900 | 0.017 | 21378 | 305 | 35 | 50 | 535 | 540 | 101 | Very Good |
| Invention Example 6 | 70 | 900 | 0.017 | 21378 | 305 | 20 | 50 | 440 | 455 | 103 | Good |
| Comparative Example 1 | 50 | 850 | 0.167 | 21589 | 432 | 70 | 50 | 540 | 500 | 93 | Poor |
| Comparative Example 2 | 70 | 1000 | 0.167 | 24472 | 350 | 70 | 50 | 560 | 500 | 89 | Poor |
| Comparative Example 3 | 0 | 950 | 0.017 | 22299 | >340 | 70 | 50 | 560 | 480 | 86 | Poor |

In Invention Examples 1 to 6 in which the values of B/A satisfied the range of the invention, it was possible to achieve the values of Y/X to be 95% or more from an effect of the suppression of decarburization from the surface layer, and it was possible to obtain improved fatigue properties from a synergistic effect with an effect that improved the fatigue properties through the alloying of the contact sections. Among Invention Examples 1 to 6, in Invention Examples 1 to 5 in which the micro Vickers hardness at a location 50 µm deep from the base material surface layer was 500 Hv or more, more improved fatigue properties could be obtained compared with Invention Example 6.

On the other hand, in Comparative Examples 1 and 2 in which the values of B/A failed to satisfy the range of the invention, the hardness of the surface part was decreased due to decarburization from the surface layer, and a synergistic effect with the effect that improved the fatigue properties through the alloying of the contact sections could not be obtained, and improved fatigue properties could not be obtained.

In addition, in Comparative Example 3 in which plating was not carried out, not only was the hardness of the surface part decreased due to decarburization from the surface layer, but the effect that improved the fatigue properties through the alloying of the contact sections could not be obtained, and therefore, naturally, improved fatigue properties could not be obtained.

As is evident from the above-described results, according to the present invention, it is possible to obtain a low-cost axle beam having excellent fatigue properties.

INDUSTRIAL APPLICABILITY

According to the present invention, it is possible to provide a low-cost quenched steel pipe member having excellent fatigue properties, a vehicle axle beam, and a method for manufacturing a quenched steel pipe member.

BRIEF DESCRIPTION OF THE REFERENCE SYMBOLS

1: AXLE BEAM
10: GI GALVANIZED STEEL PIPE
11: CONTACT SECTION
A: ZINC PLATING AMOUNT
B: HEAT TREATMENT PARAMETER
t: HOLDING TIME
T: MAXIMUM HEATING TEMPERATURE
X: MICRO VICKERS HARDNESS AT LOCATION 200 µm DEEP FROM BASE MATERIAL SURFACE LAYER
Y: MICRO VICKERS HARDINESS AT LOCATION 50 µm DEEP FROM BASE MATERIAL SURFACE LAYER

The invention claimed is:

1. A quenched steel pipe member,
    wherein the quenched steel pipe member is formed of a GI galvanized steel pipe,
    in a middle section in a longitudinal direction of the GI galvanized steel pipe, a cross-section perpendicular to the longitudinal direction has a substantially V shape including a contact section at which opposite parts of an inner circumferential surface of the GI galvanized steel pipe come into contact with each other,
    the contact section is bonded using a Fe—Zn alloy phase, and
    a micro Vickers hardness at a location 50 µm deep from a base material surface layer is 95% or more of a micro Vickers hardness at a location 200 µm deep from the base material surface layer.

2. The quenched steel pipe member according to claim 1,
    wherein the micro Vickers hardness at the location 50 µm deep from the base material surface layer of the GI galvanized steel pipe is 500 Hv or more.

3. The quenched steel pipe member according to claim 1 or 2,
    wherein the contact section is formed throughout a length that is 50% or more of a total length of the GI galvanized steel pipe.

4. A vehicle axle beam,
    wherein the quenched steel pipe member according to any one of claims 1 to 3 is used.

5. A method for manufacturing a quenched steel pipe member, the method comprising:
    press-forming a GI galvanized steel pipe so that, in a middle section in a longitudinal direction of the GI galvanized steel pipe, a cross-section perpendicular to the longitudinal direction has a substantially V shape including a contact section at which opposite parts of an inner circumferential surface of the GI galvanized steel pipe come into contact with each other;

heating and holding the press-formed GI galvanized steel pipe under conditions in which a plated zinc amount A (g/m²), a maximum heating temperature T (° C.) that is 850° C. or higher, and a holding time t (hr) at the maximum heating temperature satisfy the following formula (1); and cooling the heated and held GI galvanized steel pipe through water cooling, thereby bonding the contact section using a Fe—Zn alloy phase, $$(T+273.15)\times(\log t+20)/A \leq 340 \qquad \text{Formula (1)}.$$

6. The method for manufacturing a quenched steel pipe member according to claim 5,
wherein, in the cooling, the heated and held GI galvanized steel pipe is water-cooled to 200° C. or lower at a cooling rate of 30° C./s or more.

7. The method for manufacturing a quenched steel pipe member according to claim 5 or 6,
wherein the plated zinc amount A is 60 g/m² or more.

8. The method for manufacturing a quenched steel pipe member according to any one of claims 5 to 7,
wherein, in the press-forming, the GI galvanized steel pipe is press-formed so that the contact section is formed throughout a length that is 50% or more of a total length of the GI galvanized steel pipe.

9. The method for manufacturing a quenched steel pipe member according to any one of claims 5 to 8,
wherein, in the heating and holding, the GI galvanized steel pipe is electrically heated.

10. The method for manufacturing a quenched steel pipe member according to any one of claims 5 to 9,
wherein, in the heating and holding, the press-formed GI galvanized steel pipe is electrically heated so as to be held in a temperature range of an Ac3 point of steel or higher for 3 seconds to 30 seconds.

11. The method for manufacturing a quenched steel pipe member according to any one of claims 5 to 10,
wherein the GI galvanized steel pipe has chemical composition having an Ac3 point of 850° C. or lower.

* * * * *